United States Patent [19]
Simon et al.

[11] Patent Number: 5,961,872
[45] Date of Patent: Oct. 5, 1999

[54] METAL CONTAINER AND USE THEREOF IN A MICROWAVE OVEN

[75] Inventors: Frederick E. Simon, Lindenwold; Frederick Rick Green, Delair; Kelly A. Iliescu, Mantua, all of N.J.

[73] Assignee: Campbell Soup Company, Camden, N.J.

[21] Appl. No.: 08/395,512

[22] Filed: Feb. 27, 1995

Related U.S. Application Data

[63] Continuation of application No. 08/216,362, Mar. 23, 1994, abandoned, which is a continuation of application No. 07/886,257, May 21, 1992, abandoned.

[51] Int. Cl.$^6$ .................................................. H05B 6/80
[52] U.S. Cl. .......................... 219/729; 219/736; 219/734; 99/DIG. 14; 426/107; 426/243
[58] Field of Search ................................. 219/728, 729, 219/736, 734, 732; 99/DIG. 14; 426/107, 234, 241, 243

[56] References Cited

U.S. PATENT DOCUMENTS

| | | | |
|---|---|---|---|
| 2,501,400 | 3/1950 | Marshall . | |
| 3,941,967 | 3/1976 | Sumi et al. | 219/10.55 E |
| 4,438,850 | 3/1984 | Kahn | 206/634 |
| 4,558,198 | 12/1985 | Levendusky et al. | 219/10.55 G |
| 4,560,850 | 12/1985 | Levendusky et al. | 219/10.55 E |
| 4,641,005 | 2/1987 | Seiferth | 219/10.55 E |
| 4,656,325 | 4/1987 | Keefer | 219/10.55 E |
| 4,689,458 | 8/1987 | Levendusky et al. | 219/10.55 E |
| 4,703,148 | 10/1987 | Mikulski et al. | 219/10.55 E |
| 4,703,149 | 10/1987 | Sugisawa et al. | 219/10.55 E |
| 4,704,510 | 11/1987 | Matsui | 219/10.55 E |
| 4,754,111 | 6/1988 | Pomeroy et al. | 219/736 |
| 4,797,523 | 1/1989 | Kohnen | 219/10.55 E |
| 4,812,365 | 3/1989 | Saunders et al. | 219/10.55 E |
| 4,831,224 | 5/1989 | Keefer | 219/10.55 E |
| 4,851,631 | 7/1989 | Wendt | 219/10.55 E |
| 4,871,892 | 10/1989 | Samford | 219/736 |
| 4,875,597 | 10/1989 | Saunders | 219/10.55 E |
| 5,117,078 | 5/1992 | Beckett | 219/10.55 E |
| 5,230,914 | 7/1993 | Akervik | 219/729 X |

OTHER PUBLICATIONS

Ansberry, Jul. 31, 1991, *The Wall Street Journal*, "For Microwave," B1, B4.
Copson, 1975, In: *Microwave Heating*, Chap. 12, pp. 286–321, Westport, CN, The AVI Publishing Company, Inc.
Hicks, Sep. 2, 1989, *The New York Times*, "Steel Can Makers Try to Recoup," Section 1, p. 29, col. 3.

*Primary Examiner*—Philip H. Leung
*Attorney, Agent, or Firm*—Banner & Witcoff, Ltd.

[57] ABSTRACT

A metal container which can be utilized in a microwave oven has an interior and an exterior defined by a bottom and at least one side wall. Each side wall has a height which does not exceed 40 percent of the wavelength of the microwave radiation. The container is adapted to receive an object into its interior through an open top. Microwave-transparent electrical insulation is disposed on each side wall and on that part of the bottom which would, in the absence of insulation, contact the floor of the oven. This microwave transparent electrical insulation may be a coating on the metal, a label, or a sleeve placed around the container. A microwave transparent, electrically-insulating cap is removably disposed at the top of the container. The top of the container also may have a removable seal disposed thereon. Also, a method for storing an object, then subjecting the object to microwave radiation comprising first placing the object in the removably sealed metal container. The object then is stored in the container. To irradiate the object with microwaves, the seal is removed and the microwave-transparent, electrically-insulating cap is removably disposed over the opening. Then, the object and container are irradiated with microwave radiation for a time sufficient to heat the object. Further, a method for heating an object in the container of the invention by placing an object into the container, placing the insulating cover over the opening, and irradiating the object and the container with microwave radiation for a time sufficient to heat the object.

21 Claims, 3 Drawing Sheets

METAL CONTAINER AND USE THEREOF IN A MICROWAVE OVEN

This application is a continuation of application Ser. No. 08/216,362, filed Mar. 23, 1994, now abandoned which is a continuation of application Ser. No. 07/886,257, filed May 21, 1992 now abandoned.

BACKGROUND OF THE INVENTION

1. Field of Invention

This invention relates to a metal container which can be used in a microwave oven. In particular, the invention relates to a metal container which is electrically insulated from the oven and other objects therein. The invention also relates to a method for heating an object in a metal container in a microwave oven, and to a method for storing an object In a metal container, then irradiating the object and the container with microwave radiation without damaging the power tube of the oven.

2. Description of Related Art

Use of microwave energy to heat objects is a well-accepted practice. In particular, the heating of food in a microwave oven, both to cook and to raise the temperature of previously-cooked food for consumption, is widely accepted by consumers for use in the home. Use of a microwave oven in the home no longer is a novelty. Indeed, many products now are packaged specifically to provide ease of use in a microwave oven. Also, microwave ovens often are placed In "self-service" vending areas, affording one the opportunity to obtain a hot meal in, for example, a public vending area, in the absence of an attended kitchen. Rather, a food product purchased from, e.g., a vending machine, can be heated in a microwave oven to provide a hot meal.

An object to be heated in a microwave oven often is placed in a container. For example, a container is necessary to retain objects which are or become fluid, such as soups and sauces, and to preclude deposition of residue resulting from placing the object directly on the bottom, or floor, of the oven. Further, objects resting directly on the floor of a microwave oven typically do not heat uniformly because the standing wave pattern within the oven is not uniform in areas adja- cent oven boundaries.

Containers made from various materials are suitable for use in a microwave oven. Paper-based products, such as paper towels, napkins, paper plates, cardboard containers, and wax paper, commonly are utilized in a microwave oven. Certain plastic, ceramic, and glass products also are utilized as materials of construction for such containers. Typically, suitable paper, plastic, ceramic, and glass products neither absorb nor reflect microwave energy. Rather, these products are transparent to the energy. Therefore, energy is not utilized to heat the container. Rather, the energy is absorbed by the object and heats the object in the container.

Containers which absorb microwave radiation may not be suitable for use in a microwave oven. Obviously, it would be undesirable if energy absorbed by the container caused the container to melt or otherwise suffer damage. For example, many plastics absorb microwave energy, and would be deformed when exposed to microwave radiation. Similarly, a container made from microwave-transparent material, upon which is applied material which absorbs microwave energy, likely will be unevenly heated. Under such conditions, materials will experience thermal stress and may crack.

However, absorption of energy by the container may not be deleterious or undesirable, depending upon the object to be achieved thereby. If it is desired to use the high temperature of the container to impart a particular property to the object being heated, for example, to brown the surface of food or to maintain the thus-heated object at an elevated temperature, an increase in the temperature of the container is not deleterious.

Use of metal in a microwave oven is gaining acceptance, but only under limited conditions. Bare metal can reflect the electromagnetic energy toward the power tube (magnetron) and damage it. Also, bare metal can cause arcing between the container and other metal objects in the oven, including the oven walls. Although modern microwave ovens typically are designed to minimize damage by reflected microwaves, both reflection of microwaves and arcing preferably are minimized.

One example of an acceptable use of metal in a microwave oven is the use of a small quantity of metal, often aluminium, as a shield for a portion of the object being heated. For example, metal (aluminium) foil can be wrapped around the wings or the legs of fowl, or the end of a roast, being heated in a microwave oven to prevent absorption of a disproportionate amount of energy so that thus-protected parts are not overheated while the remainder of the object is heated. In such uses, the mass of the metal is small compared to the mass of the object being heated. Further, care must be exercised to ensure that the metal is smoothly shaped to prevent arcing.

It has been suggested that foods in containers transparent to microwaves will heat more quickly when irradiated with microwave energy if a sheet of aluminium foil is placed on the top of the food. The foil is said to direct microwaves to the bottom of the dish which helps the food simmer more quickly and evenly. Even though modern microwave ovens are designed to limit damage from reflected energy, use of metal in such a fashion should be limited so that the potential for causing damage to the power tube is reduced. In accordance with the suggestion, the aluminium foil is to be 'normal-weight', rather than 'heavy-duty', and it must be covered with plastic wrap to minimize sparking.

A region of microwave-reflective material may be arranged on a container made from microwave-transparent material, such as paper, paperboard, cardboard, or glass. Such reflective regions may be utilized to shield the content of the container, in whole or in part, from electromagnetic energy. Such a container is disclosed in U.S. Pat. No. 4,703,149. In contrast, a region formed of ferrite material is heated by absorption of microwave energy until the temperature of the material reaches the Curie temperature, above which the material ceases to absorb microwave energy. Other microwave-absorptive material disposed on a microwave-transparent container also is heated by microwave irradiation. Thus, at least in part, heat is imparted to the object by conduction from the heated microwave-absorptive area. Such heating often is used to provide a "browning" effect to food in the container. A container having a microwave-absorptive surface formed by a very thin layer of aluminium is disclosed in U.S. Pat. No. 4,641,005. As disclosed in the patent, although aluminium and other electrically conductive elemental metals typically do not absorb microwave energy, a very thin layer thereof (about 700 angstroms for aluminium) does absorb microwave energy and becomes heated.

Metal containers which are coated to be suitable for use in a microwave oven are disclosed in U.S. Pat. Nos. 4,558,198 and 4,560,850. The patents disclose four criteria which must be satisfied to make a metal container suitable for use in a microwave oven. Both interior and exterior surfaces must be coated with microwave-absorbing material, which is said to preclude potentially deleterious reflection of electromagnetic energy back to the power tube. In addition to these coatings and covering, the shape of the container is strictly controlled. The side walls must be smoothly curved and free of wrinkles. Further, the height of the side walls is limited to about 33 millimeters. The shallow structure is said to minimize side wall height and reduce microwave reflection, allowing more energy to flow into the food and distribute heat more evenly. Importantly, each corner has a "generous" radius of curvature (about ⅞-inch). The top of the container is provided with a smoothly-curved bead having a diameter of about ⅛-inch. This diameter neither promotes arcing nor cracks or breaks the organic coating. However, a heat-resistant, electrically-insulating, microwave-transparent plastic lid covers the outermost edges at the top of the container to physically separate and electrically insulate these edges from the wall of the oven and from other containers in the oven. The lid also serves to trap steam within the container, thus providing additional heating of the object in the container.

In U.S. Pat. No. 4,558,198, although the coating material is described solely as microwave-diffusing, the claims are directed to a coating which is 'heat-resistant, electrically insulating plastic . . . being effective to diffuse . . . microwave energy . . . ' Thus, the patent discloses two types of coatings for the outside of the container; one which only diffuses microwave energy, and one which both diffuses microwave energy and insulates electrically.

The container disclosed in U.S. Pat. No. 4,560,850 is similar in shape to the container disclosed in the '198 patent. In addition to the criteria ('generous radii') relating generally to the shape of the container, the '850 patent discloses formation of a 'steam port' in a raised portion of the bottom of the container. This port both allows steam to escape from the container and directs the flow of thus-escaped steam to the bottom of the container to provide additional heat thereto. All surfaces of this container are coated with material which diffuses microwaves, but electrical insulation capability is not required of this coating.

The tendency of a metal container in a microwave oven to arc is said to be reduced by forming the metal portion of the container in accordance with the disclosure of U.S. Pat. No. 4,851,631. This patent discloses that resonance in the metal part of a container causes deleterious effects, including arcing, localized overheating, scorching of food or non-metallic portions of the container, overheating of food near the edge of the metal, and similar problems. According to the patent disclosure, resonance can be reduced by avoiding use of metal portions having dimensions which exacerbate resonance and by forming the metal portions to reduce resonance including, inter alia, overlapping the ends of metal portions of the container to create capacitance therein.

Use of metal containers in a microwave oven has heretofore been limited. Although many microwave-transparent containers have been developed, such containers are often relatively costly or are otherwise unsuitable for selected uses. For example, paper containers often are not sufficiently sturdy and do not provide appropriate vapor barrier properties for use as containers for food products. Thus, not only is it difficult to ensure continuing integrity of the container, but also moist products are subject to dehydration. Glass and ceramic containers are strong and resistant to fluids, but are subject to breakage. Other microwave-transparent materials, such as plastic, often meet objections based on environmental considerations. Also, it is difficult and relatively expensive to provide a tamper-resistant plastic seal which is retortable, as typically is required by food processors.

SUMMARY OF THE INVENTION

This invention relates to a metal container which can be utilized In a microwave oven and has an Interior and an exterior defined by a bottom and at least one side wall. Each side wall has a height which does not exceed 40 percent of the wavelength of the microwave radiation utilized in the microwave oven. The container is adapted to receive an object into its interior through an open top.

Microwave-transparent, electrically-insulating material is disposed on the exterior of each side wall and on the exterior part of the bottom which would, in the absence of the insulation, contact the floor of the oven. The insulation prevents physical contact between the exterior of the container and other objects and essentially eliminates arcing. A microwave-transparent, electrically-insulating cap is removably disposed at the top of the container. When disposed on the container, the cap prevents physical contact between parts of the container not physically isolated from other objects by the side wall electrical insulation. When the cap is removed from the container, the object can be inserted Into or removed from the interior of the container through the opening in the top thereof. The top of the container also may have a removable seal disposed thereon.

The physical characteristics (i.e., shape, diameter, height, and insulation), of the container essentially preclude metal-to-metal contact and minimize reflection of microwaves.

This invention also relates to an economically-produced, retortable metal container especially suited for food storage and subsequent heating in a microwave oven. In particular, metal containers provide excellent oxygen barrier properties and are resistant to tampering.

The invention further relates to a method for heating an object in a metal container in a microwave oven and to a method for storing an object, then subjecting the object to microwave radiation. The object to be heated is placed in the metal container through the opening, the cap is placed over the opening, and the object and container are exposed to microwave radiation for a time sufficient to heat the object. To store the object before heating, the object is placed in the metal container and the container is removably sealed. The object then is stored in the container. To irradiate the object with microwaves, the seal is removed and the microwave-transparent, electrically-insulating cap is removably disposed over the opening resulting from removal of the seal. Then, the object and container are irradiated with microwave radiation for a time sufficient to heat the object.

DETAILED DESCRIPTION

This invention is directed to a metal container which can be utilized in a microwave oven. The invention also relates to a method for heating an object in a metal container in a microwave oven, and to a method for storing an object in a metal container, then irradiating the object and the container with microwave energy. It has been discovered that metal containers are especially efficient and suitable for use in a microwave oven when they are electrically insulated from the oven and other objects in the oven and are designed to allow microwave energy to penetrate into the object being heated. Electrical insulation precludes arcing, which can damage the container, the oven, and in extraordinary circumstances, the microwave power (magnetron) tube.

Throughout the specification and claims, the term 'metal' comprises microwave-reflective elemental metals and alloys, such as but not limited to aluminium, aluminium alloys, zinc-plated steel, tin-plated steel, and polymer-coated steel.

A metal container manufactured in accordance with the subject invention can comprise any combination of microwave-reflective elemental metals and alloys. A container of this invention which is intended to be disposed after one use, such as a container to be sold from a vending machine, typically is manufactured from aluminium, aluminium alloys, and coated steel.

Figure 1:
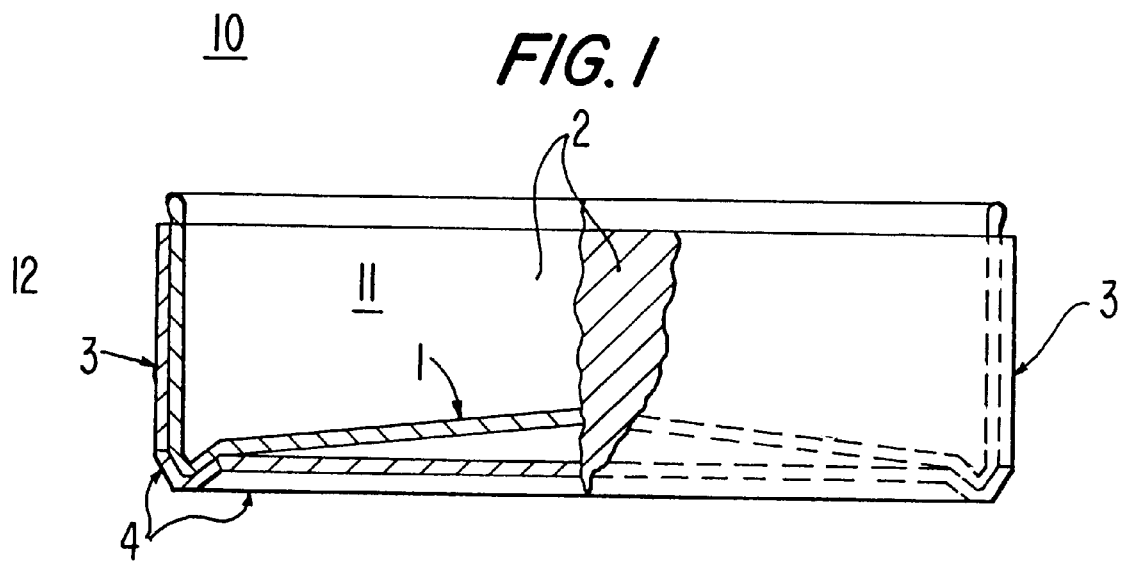
FIG. 1 is a plan view of a container made in accordance with this invention.
Figure 2:
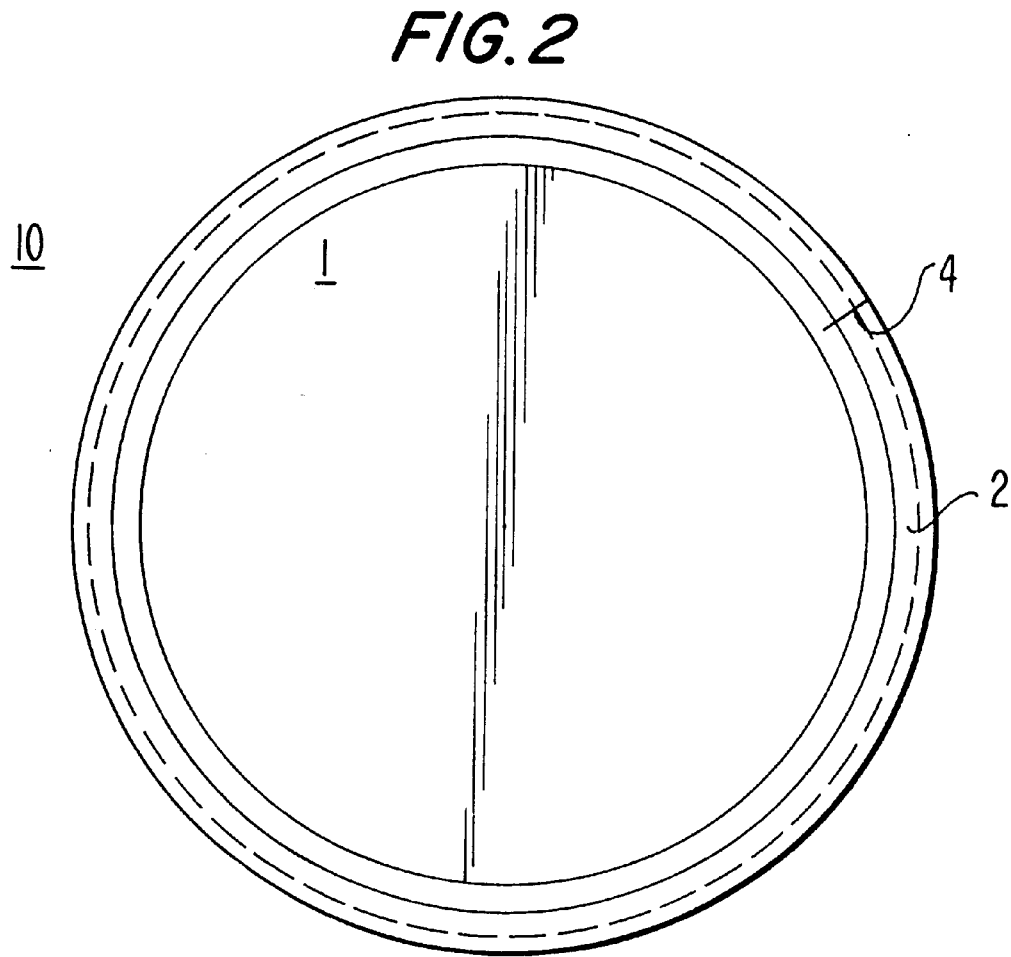
FIG. 2 is a bottom view of a container made in accordance with this invention.
Figure 5:
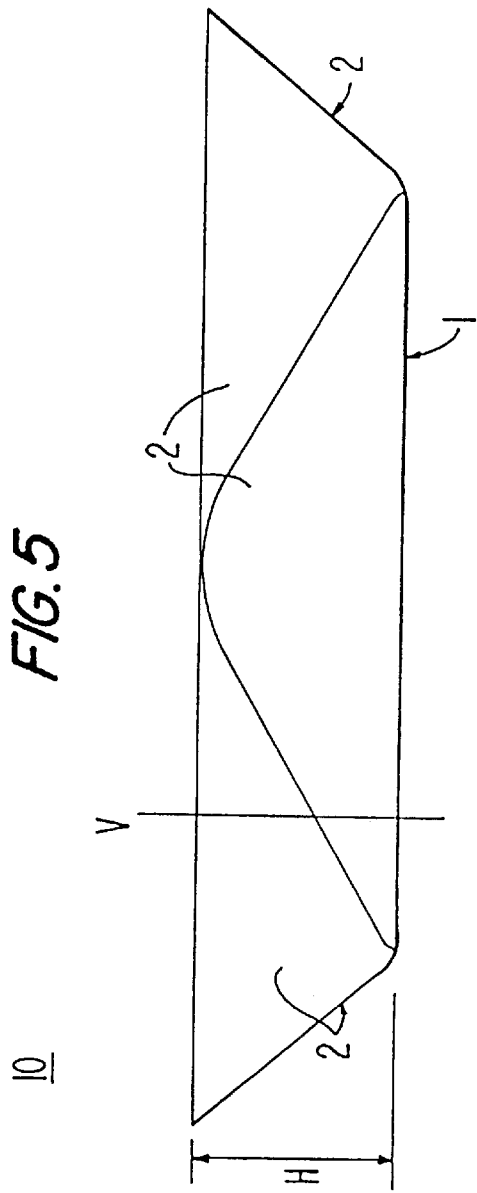
FIG. 5 is a simplified plan view of a container of the invention which does not have a uniform cross-section.

In the several embodiments shown, like reference numbers or letters are used to designate like portions in the several embodiments. Referring in particular to FIGS. 1 and 2, the metal container of the invention 10 has an interior 11 and an exterior 12 defined by a bottom 1 and at least one side wall 2. For example, if the cross-section of the container is round, oval, or similarly shaped, the side wall is continuous and can be referred to as a single side wall. Such a container is illustrated in FIGS. 1 and 2. However, if the cross-section of the container is not shaped so that a continuous side wall can define the container, the container then can be said to have a plurality of side walls. Further, the cross-section of the container may change with distance from the bottom. An example of such a container is illustrated in FIG. 5, wherein the bottom of the container is square, the top of the container is round, and the cross-section changes as the distance from the bottom changes. Each non-horizontal wall 2 of such a container may be considered a side wall for the purposes of this specification and claims.

Skilled practitioners recognize that discontinuities in containers which are not microwave-transparent may cause arcing because microwave radiation becomes concentrated at such intersections. Such discontinuities occur, for example, at the intersection of the bottom and a side wall, and at the intersection of a plurality of side walls. Preferably, therefore, containers manufactured in accordance with this invention are shaped to avoid such discontinuities, i.e., intersections of surfaces are formed with rounded surfaces rather than angular intersections.

More preferably, the container of the invention is round or oval in cross-section, as illustrated in FIGS. 1 and 2. Not only are such containers relatively easy to manufacture, but also the smoothly contoured side wall minimizes the number of discontinuities in contour which tend to cause deleterious effects when exposed to microwave irradiation.

A container manufactured in accordance with the invention may be of any cross-sectional shape. Similarly, it may be manufactured in accordance with methods known to skilled practitioners.

Preferably, the portion of the container which is metal is formed from aluminum, aluminum alloy, or coated steel and is manufactured in accordance with known container-forming techniques. For example, an aluminum or aluminium-alloy container typically is formed by die stamping, whereas a steel "tin" can typically is formed from a plurality of shaped parts which are joined by welding.

It has been discovered that objects in a metal container can be safely, effectively, and efficiently heated with microwave energy if the container is electrically insulated and has walls which extend vertically less than about 40 percent of the wavelength of the microwave energy utilized to heat the object. When the vertical height of the sides of the metal container of the invention is less than about 40 percent of the wavelength of the microwave energy, a large fraction of the energy enters the interior of the container and is absorbed by the object therein. Skilled practitioners will realize that if the vertical height of the sides of a metal container of the invention are higher than about 40 percent of the wavelength of the microwave energy, they will require longer heating times than metal containers having walls which extend vertically less than about 40 percent of the wavelength of the microwave energy.

Figure 6:
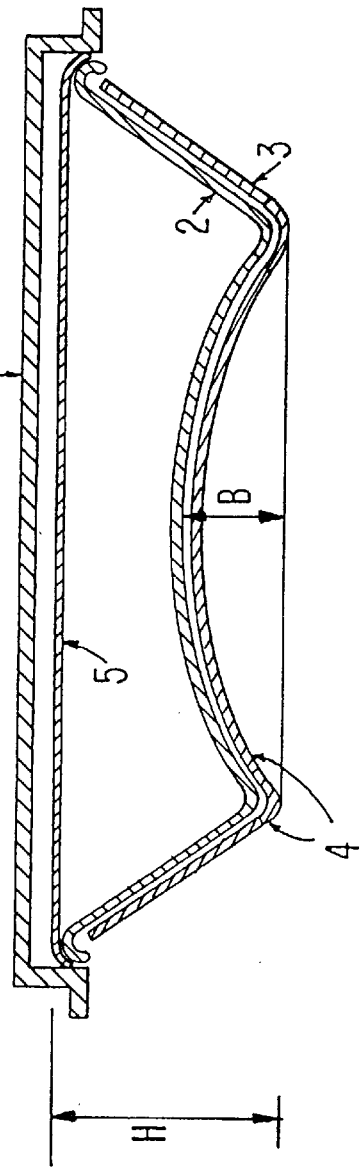
FIG. 6 is a simplified plain view of a container comprising a domed bottom.

A metal container according to the invention preferably has walls which extend vertically less than about 35% of the wavelength of the microwave energy utilized to heat the object. More preferably, the walls of a container manufactured in accordance with the invention extend vertically less than about 30%, and most preferably, less than about 25%, of the microwave energy utilized to heat the object.

Where a plurality of side wall surfaces exist in a vertical line V, as illustrated in FIGS. 5 and 6, the height H of the side walls is determined by measuring the distance the combination of side walls extends vertically away from the bottom. The height of the domed region is indicated by reference letter B. The dome should be designed to prevent metal-to-metal contact between the container and the oven, and to permit the object to be evenly heated. Skilled practitioners will be able, with the guidelines presented herein, to design a suitable container.

Typically, the frequency of microwave radiation utilized in microwave ovens made for use in the home operate at a frequency of 2450 MHz. However, use of 915 MHz, 5800 MHz, 22,125 MHz, and other frequencies is authorized. Thus, the size of containers suitable for use in these ovens varies.

As skilled practitioners recognize, the wavelength of microwave radiation is calculated by dividing the speed of the radiation, i.e., $3 \times 10^8$ meters per second, by the frequency. Thus, for example, the wavelength of microwave radiation having a frequency of 2450 MHz is about 122 mm. Thus, the height of a container to be utilized in a typical microwave oven which operates at 2450 MHz is preferably less than about 48.8 mm. Preferably, the height of a container to be utilized in a typical microwave oven which operates at 2450 MHz is less than about 42.7 mm. More preferably, the height of a container is less than about 36.6 mm, and most preferably, less than about 30.5 mm.

Although there is no minimum side wall height for a container manufactured in accordance with this invention, skilled practitioners recognize that an extremely shallow container, i.e., one having side walls which are less than about 6 mm, may have limited usefulness. Although such a shallow container often is difficult to handle, especially when filled with a fluid material, such containers are contemplated within the scope of this invention.

The preferred shape of the bottom of the container depends upon the object to be heated therein. If the object tends to retain its shape during heating (for example, a piece of meat), the bottom can be essentially planar. However, for most foodstuffs and other objects which do not essentially retain their shape, it is preferable not to utilize a planar bottom. Rather, under such circumstances, the bottom preferably is raised slightly, or 'domed', at the center of the container, as illustrated in FIG. 1 and FIG. 6. Skilled practitioners recognize that, under appropriate circumstances as described herein, a domed shape not only improves the distribution of microwave energy within the object being heated, but also distributes the object being heated within the container. Each aspect aids even distribution of heat within the object. However, such a feature is less useful if the object does not conform to the shape of the bottom. Although distribution of the object within the container will not be affected, distribution of microwave energy into the object itself will be improved.

The container is shaped so that the object to be heated can be inserted into the container through an opening in the top of the container. It should be noted that use of the words 'top' and 'bottom' in the specification and claims relates to the orientation of the container as it typically would be used in accordance with this invention. For example, an object lying on a surface (such as a conveyor belt) could be inserted into a container by placing the container over the object, then inverting the container and surface. Such a loading operation is contemplated within this invention.

Without regard to how the object is loaded into the container, care must be taken in designing a container which will afford the opportunity to impinge microwave radiation into the object. For example, essentially surrounding the object with microwave-reflective material would preclude microwave radiation from impinging upon and heating the object. Therefore, the top opening of a container of the invention provides an opening sufficient to afford microwave egress to the object. Typically, therefore, the opening is at least about 50 percent of the area of the bottom. Preferably the area of the opening is at least about 75 percent, and more preferably is at least about 100% percent of the area of the bottom. It has been discovered that top opening area of at least 75 percent of bottom area is preferred to ensure that "convenience foods" heat sufficiently quickly.

Further, the diameter of the top opening preferably is at least as large as the wavelength of the microwave energy utilized to heat the object in the container. Thus, for a typical oven utilized by consumers, which operates at a frequency of 2450 MHz, the opening at the top of the can preferably has at least one dimension of at least about 122 mm. More preferably, the opening at the top of the container has a dimension larger than the wavelength of the microwave radiation. Openings smaller than the microwave wavelength, although contemplated within this invention, reduce the effectiveness of the container as a microwaveable container because the heating time increases exponentially as the dimensions of the top opening are decreased to less than the microwave wavelength. A skilled practitioner will be able, with the guidelines presented herein, to design a suitable container.

Referring again to FIGS. 1 and 2, microwave transparent electrical insulation 3 is disposed on each side wall 2 and microwave transparent electrical insulation 4 is disposed on at least that portion of the bottom 1 which would, in the absence of the electrical insulation contact the floor of the oven. This insulation essentially eliminates the likelihood of arcing from the electrically conductive material forming the side walls and bottom of the container by electrically insulating them. Such insulation not only physically prevents contact between the container and both the floor of the oven and other objects in the oven, but also forms an electrically non-conductive barrier which essentially eliminates arcing between the electrically conductive side walls and bottom of the container and the floor and other objects in the oven.

It has been discovered that use of a container comprising a significant quantity of metal in a microwave oven is not deleterious to the oven if the container not only is covered with a quantity of electrically non-conductive material sufficient to ensure that arcing is essentially eliminated but also is designed so that a significant fraction of the microwave energy is absorbed by the object being heated. A container properly designed as disclosed herein also shortens cooking time.

Any microwave-transparent, electrically-insulating material is suitable for use as metal-covering material in accordance with the invention. Examples of such material includes cardboard; ceramics; selected plastics such as polystyrene, polypropylene, and polyethylene; and selected glasses, such as soda glass and potash glass.

Suitable insulating material can be applied directly to the container, e.g., in the form of a polymeric or ceramic film. In the alternative, a separate label which comprises the insulating material suitably is applied to the container. Both materials can be utilized simultaneously.

A particularly preferred insulating material is comprised of an expanded polystyrene label designed to shrink around the bottom of the container. The insulating material applied to the sides may differ from or be the same as the insulating material applied to the bottom. Further, the insulating material may be formed as one piece or a plurality of pieces. Each piece may protect both a portion of the side wall and a portion of the bottom.

The insulating material also may be selected based on a further advantage desired. For example, a foamed polystyrene material, commonly called 'styrofoam', is a suitable insulation material. A further advantage of using foamed polystyrene material is that such material also is thermally insulating. Therefore, a container coated with foamed polystyrene material not only thermally insulates the object and container against heat loss to the surroundings, but also protects the person removing the potentially hot container from the oven after heating. Foamed polystyrene has the further advantage of being relatively inexpensive, durable, attractive, and receptive to printing and decoration.

The electrically-insulating material need not be either microwave-diffusing or microwave-dispersing, nor is the material disposed on both the interior and the exterior of the container of the invention. Skilled practitioners will be able, with the guidance provided herein, to insulate the container in accordance with the invention.

Business considerations such as cost, availability, durability, and appearance may enter into the selection of the material for each particular use. For example, a container which is intended for re-use might have a more durable Insulating coating, whereas a container intended to be discarded after one use might use a less-durable Insulation material, such as polystyrene.

The top of the container can be adapted to receive a removable seal. The purpose of this seal is to ensure that the condition of an object stored In the container remains unchanged. Such a removable seal is especially important if the object is a foodstuff, because the purity of foodstuffs must be maintained. The removable seal may be fashioned from any suitable material. Just as selection of material from which the microwave-transparent, electrical insulation typically is based on economic and other factors, so too is selection of the material from which the removable seal is manufactured.

Figure 3:
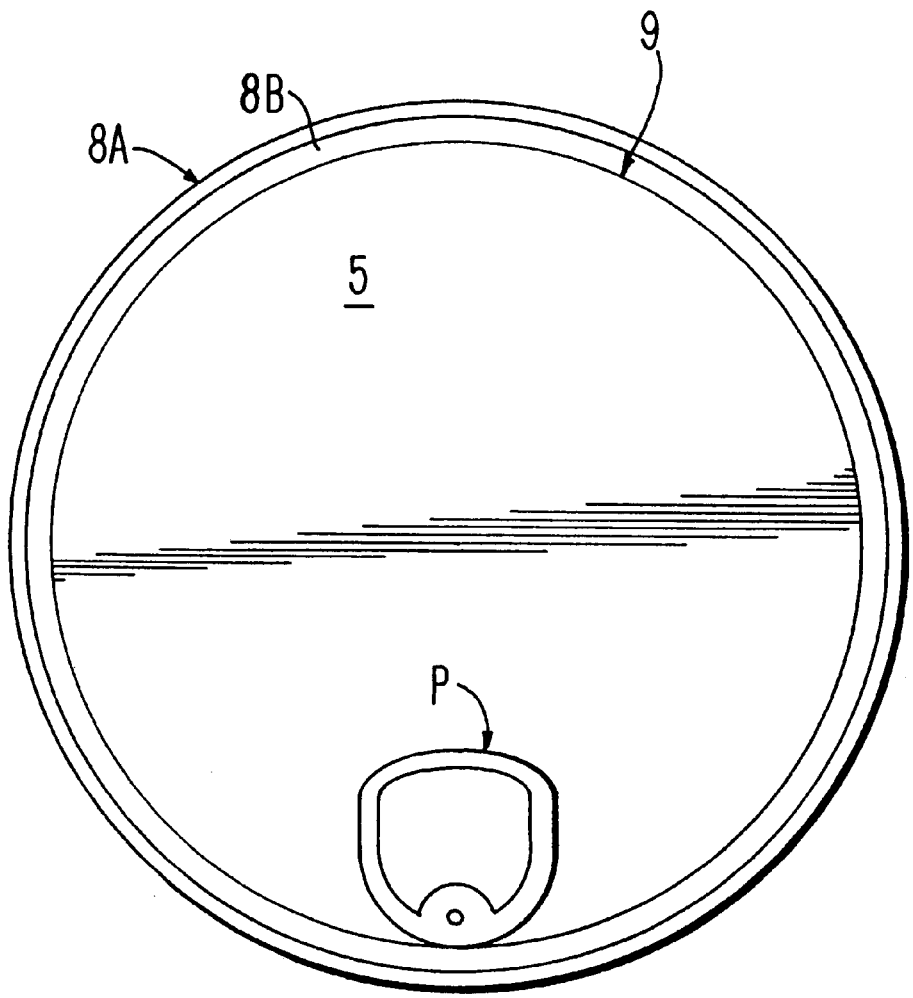
FIG. 3 is a top view of a container made in accordance with this invention and which comprises a removable seal.

A seal on a container for foodstuffs often is required to withstand conditions under which food is retorted In preparation for storage. A preferred embodiment of such a seal is illustrated in FIG. 3. As illustrated therein, removable seal 5 is fixed to side wall 2 (not shown) by seal attachment 8. Seal attachment 8 comprises seal attachment ring 8A and seal ring 8B. Specifically, a preferred embodiment of removable seal 5 comprises a "lift-and-pull" top, i.e., a relatively thin disc of relatively soft metal, typically aluminium or an alloy thereof, which is scored between removable seal 5 and seal ring 8B in the form of the intended opening. This scoring in the shape of the Intended opening is identified at 9 in FIG. 3. A 'pull-tab' P is attached to the disc near the scoring. When this 'pull-tab' is lifted, a portion of the scored area is broken through and the seal is breached. Then, the remainder of the scored area which defines the removable seal can be broken through by lifting the pull-tab away from the top of the container.

All-metal embodiments of the removable seal typically are utilized because they are reliable, can withstand conditions under which foodstuffs are retorted or otherwise treated to prepare them for storage in such containers, and are easy to remove. However, other embodiments and other materials of construction suitably are used to form a removable seal. For example, a screw-type cap can be utilized, and retortable plastic removable seals are known in the art.

Figure 4:
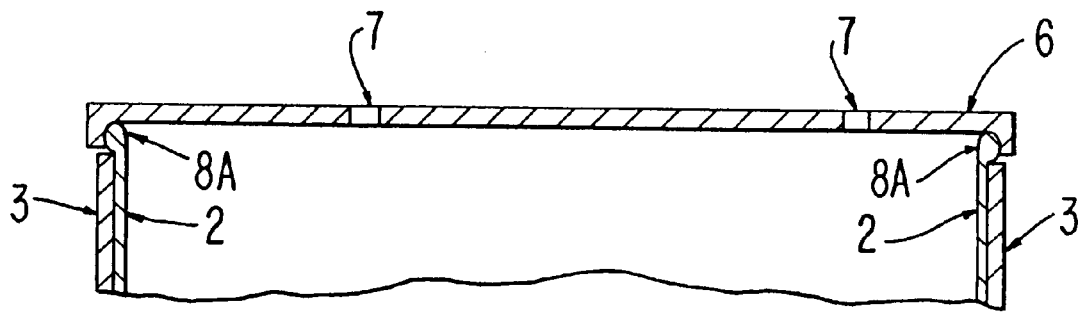
FIG. 4 is a partial plan view of a container of the invention with a removable cap in place over the opening at the top of the container.

A microwave-transparent, electrically-insulating cap is removably disposed at the top of the container. As illustrated in FIG. 4, removable cap 6 has a shape which matches and mates with the shape of the top of the container. In the embodiment illustrated, seal attachment ring 8A also retains the removable cap over the opening. When disposed on the container, the cap prevents physical contact between parts of the container not physically isolated from another object in the microwave oven by the side wall and bottom electrical insulators. When the cap is removed from the container, the object can be inserted into or removed from the interior of the container through the opening in the top of the container.

It has been discovered that it is not necessary to ensure that the surface at the top of the container where the side wall ends comprises a 'generous radius'. Indeed, seal attachment ring 8A in a preferred embodiment of the container of the invention is a known, formed edge which is not rounded. It has been discovered that the electrically-insulating cap is sufficient to prevent arcing.

The cap can be made from any microwave-transparent, electrically-insulating material. The materials from which the side wall and bottom insulation are made are suitable for use in manufacturing the cap. The cap typically extends slightly over the side wall insulation to essentially preclude arcing from any electrically conductive material which is not covered by the side wall insulating material when the cap is disposed over the opening in the top of the container.

As is best illustrated in FIG. 4, cap 6 preferably is perforated, as at 7, to allow heated gases and vapors to escape from the container. Skilled practitioners recognize that such venting typically is necessary to avoid excessive pressure buildup in the container. Thus, without such venting, the container being heated may explode, or the cap may be displaced from the top of the container by the expanding gas and collection of vapor between the unperforated cap and the object.

The number and dimension of perforations can be determined in accordance with the requirement of the use to which the container is put. For example, to retain moisture within the object being heated, perforations should be sized with the minimum area necessary to afford escape of a sufficient quantity of gases and vapors to avoid over-pressurization. Typically, a single perforation having a diameter of 4 mm is sufficient to vent steam liberated from an 8-ounce food serving. Preferably, at least two such perforations are utilized to ensure that pressure does not build up in the container during heating of the object therein. Similarly, to evaporate moisture, as when concentrating a fluid or allowing water, e.g., water of reaction, to escape from the container, the number and dimension of perforations will be relatively large. A skilled practitioner, with the guidance provided herein, will be able to design a cap suitable for the intended use.

Any manner of disposing the removable cap so that it can be disposed over the opening at the top of the container, or removed therefrom so that the object can be removed from or inserted into the container, may be utilized on a container manufactured in accordance with this invention. For example, the cap can be hingedly fixed to the container. The cap can be hinged to a band of material which extends around the side walls below the opening at the top of the container, or to the side wall itself. Similarly, the cap can screw onto or snap over the top of the container. Similarly, the removable seal can be screwed onto the container, and the removable cap can utilize the same threads after the removable seal has been removed. Any manner of attaching the cap which ensures that the cap can be disposed over the opening or removed therefrom and that no electrically-conductive parts are, become, or remain electrically uninsulated; such uninsulated parts may induce arcing.

The container of the invention is used to contain an object to be heated in a microwave oven. The object is placed in the container through opening 9 illustrated in FIGS. 1 and 3. Microwave-transparent, electrically-insulating cap 6 is disposed over the opening at the top of the container. Then, the object and the container are placed in a microwave oven and are irradiated with microwave energy for a time sufficient to heat the object. With the cap in place and the sidewalls and bottom electrically insulated, the object is satisfactorily heated in the container without damaging the power (magnetron) tube by impinging radiation reflected from the electrically conductive container. In particular, in accordance with the container of the invention, the shape of the container, and consequently, the shape of the microwave-absorbing component (i.e., the object to be heated), minimizes the amount of reflected radiation which might impinge upon the magnetron and maximizes the amount of radiation delivered to the object being heated.

When fitted with a removable seal, the container described and claimed herein is suitable for storage of an object, then exposing the object to microwave radiation. The object is placed in the container through opening 9, as shown in FIGS. 1 and 3. Then, a removable seal is fitted over opening 9 and sealed to side wall 2 at seal attachment ring 8A. The object then is stored. If the object is a foodstuff, it may be desired to treat the object and the container to ensure wholesomeness of product throughout the storage period. Such treatment may take the form, for example, of pasteurization, or similar treatment in a retort or other heating device.

When the stored object is to be exposed to microwave radiation, the removable seal typically is removed, and the microwave-transparent, electrically-insulating cap is disposed over the opening at the top of the container. The object and the container then are irradiated with microwave energy for a time sufficient to heat the object. With the cap in place and the sidewalls and bottom electrically insulated, the object is satisfactorily heated in the container without producing arcing.

Skilled practitioners recognize that ranges of time required to heat an object cannot always be suggested because there exist many variables which affect the calculation of the proper heating time. Some of these variables are easily measured (mass, dielectric constant, thermal conductivity), whereas others, such as the efficiency by which the object absorbs microwave energy within the confines of the metal container, are more difficult. Each of these variables is an important consideration which renders it impractical to set forth a heating time. However, skilled practitioners will be able, with the guidance provided herein, to determine the appropriate treatment period.

chicken, and bean soup also were placed in separate containers having applied thereto a styrofoam label, and then sealed with a plastic cap. Each container was separately heated in the microwave oven for the period of time indicated in Table 1. Temperatures of the heated products were taken at various positions about the containers and are indicated in Table 1.

Experiment 1 was carried out using an unvented cap and was heated for 2 minutes. Experiment 2 utilized a vented cap on the same container used in Experiment 1, and the product was heated for an additional two minutes bringing the total heating time to 4 minutes.

TABLE 1

| | | | | Temperature, ° C. | | | | |
|---|---|---|---|---|---|---|---|---|
| Experiment | Product | Cooking Time (min) | Bottom Center of Can | Metal Edge w/Cap | Center of Product | 4 Edges of Product | Stirred Center | Stirred Edges |
| 1 | Chicken Stew (unvented cap) | 2 min. | 30 | —* | 55 | 34, 36, 37, 38 | — | — |
| 2 | Chicken Stew (vented cap) | 4 min. | 39 | 41 | 67 | 52, 55, 64, 55 | 69 | — |
| 3 | Tomato Soup | 3 min. | — | 41 | 56 | 57, 51, 58, 61 | 53 | — |
| 4 | Bean with Bacon Soup | 3.5 min. | — | 51, 52, 49, 49 | 71 | 61, 55, 58, 62 | 57 | 60, 60, 60, 61 |
| 5 | Chicken Noodle Soup | 3.5 | — | 48, 49, 49, 49 | 70 | 56, 60, 62, 60 | 60 | 58, 61, 59, 59 |
| 6 | Bean with Bacon Soup | 5 min. | — | 74 | 113 | 94, 95, 96, 94 | 87 | 86, 86, 88, 81 |
| 7 | Bean Soup | | 96 | | | | | |
| 8 | Piece of Chicken | | 75 | | | | | |

*— represents a situation where it was impractical to obtain an acurate measurement.

With regard to heating of foodstuffs, it is preferred that the time required to heat the food not exceed about 5 to 10 minutes. More preferably, between about 3 to 5 minutes is sufficient to heat a single serving of food.

Further, use of a metal container for heating foodstuffs with microwave radiation is particularly convenient. In addition to the economic and packaging benefits described herein, the metal container of the invention provides a method for heating foodstuffs without "bumping." As skilled practitioners recognize, "bumping" is the phenomenon manifested by sudden and violent vaporization of water due to foods being heated too rapidly. Bumping may cause the container to tip. Normally, plastic containers provide very fast heating of the surface layers while the center remains relatively cold. Thus, products heated in plastic containers tend not to be heated uniformly, leading to poor quality. The longer heating times associated with the use of metal containers therefore is an advantage not only in product quality, but also in reducing or eliminating bumping.

EXAMPLES

Example 1

Four soup products and two conventional food products were heated in a 401×105 size aluminum 2-piece container using a 700 watt microwave oven having a wavelength of 2450 MHz. The cans were filled with chicken stew, tomato soup, bean with bacon soup, and chicken noodle soup and then sealed with a plastic vented cap. A styrofoam label was applied around the containers as the microwave transparent, electrically-insulating material. A serving-size piece of As can be seen from the above table, conventional soups can be evenly heated in a conventional microwave oven using the containers of the present invention.

Although preferred embodiments of the invention have been disclosed herein, those skilled in the art will appreciate that changes and modifications may be made without departing from the spirit of this invention, as defined in and limited only by the scope of the appended claims.

We claim:

1. An apparatus in which an object contained therein is heated with microwave radiation comprising:

(a) a metal container having an interior and an exterior defined by a bottom and at least one side wall and adapted to receive the object into the interior of the container through an open top, each of said at least one side wall having a height less than about 40 percent of the wavelength of the microwave radiation used to heat the object contained therein;

(b) microwave transparent bottom and side wall electrical insulator means for electrically insulating the exterior of the container by preventing physical contact between the exterior surfaces of the metal container and other objects, said insulator means being disposed on the exterior surface of each of said at least one side wall and on that part of the bottom which, in the absence of said insulator means, would contact the floor of the oven, the interior surfaces of each of said at least one side wall and bottom lacking electrical insulator means;

(c) microwave transparent electrically insulating cap means for preventing physical contact between any part of the top of the container not physically isolated from other objects by the side wall insulator when said electrically insulating cap means is disposed over the top of the container, said cap means being removably disposed at the top of the container to allow insertion of the object into or removal of the object from the interior of the container when the cap means is removed from the container.

2. The apparatus of claim 1, further comprising means for removably sealing the object into the container.

3. The apparatus of claim 2 in which said removable insulating cap means is removably disposed over said means for removably sealing the object into the container.

4. The apparatus of claim 1 in which the bottom of the container is domed into the interior.

5. The apparatus of claim 1 in which said at least one side wall is angled outwardly from the interior.

6. The apparatus of claim 1 wherein said microwave transparent means comprises a coating on the metal container.

7. The apparatus of claim 1 wherein said microwave transparent electrical insulator means comprises an electrically insulating label positioned on the metal container.

8. The apparatus of claim 1 wherein said at least one side wall has a height less than about 30 percent of the wavelength of the microwave radiation.

9. The apparatus of claim 1 wherein said at least one side wall has a height less than about 25 percent of the wavelength of the microwave radiation.

10. The apparatus of claim 1 in which the container is made from a metal selected from the group consisting of aluminum, aluminum alloy, zinc-plated steel, tin-plated steel and polymer coated steel.

11. The apparatus of claim 10 in which the metal is aluminum or aluminum alloy.

12. The apparatus of claim 10 in which the metal is zinc-plated steel, tin-plated steel or polymer coated steel.

13. The apparatus of claim 1 in which the area of opening of the top is 75% to 100% of the area of the bottom wall.

14. The apparatus of claim 1 in which the side walls are perpendicular to the horizontal axis of the container.

15. The apparatus of claim 1 in which the microwave transparent bottom and side wall electrical insulator means are neither microwave-diffusing nor microwave-dispersing.

16. The apparatus of claim 1 in which the microwave transparent bottom and side wall electrical insulator means is cardboard, ceramic, a plastic selected from the group consisting of polystyrene, polypropylene and polyethylene, or a glass selected from the group consisting of soda glass and potash glass.

17. The apparatus of claim 1 in which the microwave transparent bottom and side wall electrical insulator means is styrofoam.

18. A method for heating an object by microwave radiation comprising:

(a) placing the object to be heated in a metal container having an interior and an exterior defined by a bottom and at least one side wall and adapted to receive the object into the interior of the container through an open top, each of said at least one side wall having a height less than about 40 percent of the wavelength of the microwave radiation used to heat the object contained therein and having a microwave transparent bottom and side wall electrical insulator means for electrically insulating the exterior of the container by preventing physical contact between the exterior surfaces of the metal container and other objects, said insulator means being disposed on the exterior surface of each of said at least one side wall and on that part of the bottom which, in the absence of said insulator means, would contact the floor of the oven, the interior surfaces of each of said at least one side wall and bottom lacking electrical insulator means;

(b) disposing a microwave transparent electrically insulating cap means on the top of the container, said insulating cap means preventing physical contact between any part of the top of the container not physically isolated from other objects by the side wall insulator when said electrically insulating cap means is disposed over the top of the container; and (c) irradiating the object in the container with microwaves for a time sufficient to heat the object.

19. The method of claim 18 wherein said object to be heated is a foodstuff.

20. A method of storing an object and subsequently heating the object by microwave radiation comprising:

(a) placing the object to be stored in a metal container comprising having an interior and an exterior defined by a bottom and at least one side wall and adapted to receive the object into the interior of the container through an open top, each of said at least one side wall having a height less than about 40 percent of the wavelength of the microwave radiation used to heat the object contained therein; microwave transparent bottom and side wall electrical insulator means for electrically insulating the exterior of the container by preventing physical contact between the exterior surfaces of the metal container and other objects, said insulator means being disposed on the exterior surface of each of said at least one side wall and on that part of the bottom which, in the absence of said insulator means, would contact the floor of the oven, the interior surfaces of each of said at least one side wall and bottom lacking electrical insulator means; and sealing the container with removable seal means;

(b) storing the object in the container until ready to heat the stored object;

(c) removing the seal means from the container;

(d) disposing a microwave transparent electrically insulating cap means on the top of the container, said insulating cap means preventing physical contact between any part of the top of the container not physically isolated from other objects by the side wall insulator when said electrically insulating cap means is disposed over the top of the container; and (e) irradiating the object in the container with microwaves for a time sufficient to heat the object.

21. The method of claim 20 wherein said object to be stored and subsequently heated is a foodstuff.

* * * * *